May 5, 1970 R. E. GLUSICK ET AL 3,510,850

DRIVE CIRCUITRY FOR NEGATIVE RESISTANCE DEVICE MATRIX

Filed April 30, 1968 2 Sheets-Sheet 1

INVENTORS:
RICHARD D. STEWART,
ROBERT E. GLUSICK,
BY Marvin L. Goldenberg
THEIR ATTORNEY.

DRIVE CIRCUITRY FOR NEGATIVE RESISTANCE DEVICE MATRIX

Filed April 30, 1968 2 Sheets-Sheet 2

INVENTORS:
RICHARD D. STEWART,
ROBERT E. GLUSICK,
BY Marvin L. Goldenberg
THEIR ATTORNEY.

United States Patent Office 3,510,850
Patented May 5, 1970

3,510,850

DRIVE CIRCUITRY FOR NEGATIVE RESISTANCE DEVICE MATRIX

Robert E. Glusick, Liverpool, and Richard D. Stewart, Camillus, N.Y., assignors to General Electric Company, a corporation of New York Filed Apr. 30, 1968, Ser. No. 725,308
Int. Cl. G11c *11/36*
U.S. Cl. 340—173 10 Claims

ABSTRACT OF THE DISCLOSURE

Drive circuitry for a matrix of bistable devices having a negative resistance characteristic, said circuitry employed to selectively write and erase digital information by switching said devices between one of two stable operating states, and to read out stored data. The present circuitry substantially improves drive signal tolerances of matrix operation. More particularly, the present circuitry employs logic controlled semiconductor gates for selectively applying drive signals to said matrix in a manner whereby the signal magnitude differential applied to selected devices and commonly connected unselected devices is maximized and spurious responses readily avoided.

BACKGROUND OF THE INVENTION

Field of the invention

The invention relates to the field of array drive circuitry and, in particular, circuitry of the type which selectively applies drive signals in the form of voltage or current to said arrays through logic controlled semiconductor gates.

Description of the prior art

Matrix arrays of negative resistance devices having first and second stable states defined by maximum and minimum threshold points, respectively, may have data entered therein or removed therefrom by selectively switching individual devices between said stable states. Drive circuitry known to the art establishes across all devices a single steady state bias condition for both write and erase operations at a point intermediate the maximum and minimum threshold points of the negative resistance characteristic. In one mode of operation, writing information into a single selected device is performed by increasing the drive signals applied to the column and row conductors of said device by equal amounts so as to exceed the maximum threshold and thereby place the device in its second stable state. For erasing stored information, the drive signals applied to the column and row conductors of the selected device are decreased by equal amounts so as to fall below the minimum threshold, placing the device in its first stable state. Devices common to the row and column of the selected device receive a half select signal equal to half the signal magnitude supplied to said selected device. Because devices of the type in question cannot be fabricated with complete uniformity and precisely defined operating parameters, it is critical that there be a sufficient difference between whole and half select drive signals so as to readily discriminate between the selected device and unselected devices and avoid spurious switching. The present invention is intended to provide such signal magnitude difference for write, erase and also readout operations.

SUMMARY OF THE INVENTION

Accordingly, the invention has as a principal object to provide a novel circuit for applying drive signals to a matrix of negative resistance devices so as to readily discriminate between selected and unselected devices during write, erase and readout operations.

Another object of the invention is to provide a novel drive circuit as above described which maximizes the signal magnitude differential applied to selected and commonly connected unselected devices.

These and other objects of the invention are accomplished by a drive circuit which selectively applies drive signals to a storage matrix of bistable devices exhibiting a negative resistance characteristic having maximum and minimum threshold points defining, respectively, first and second stable states of operation. The negative resistance characteristic may be of the S type or N type. For the S type the maximum and minimum threshold points correspond to voltage, and for the N type the maximum and minimum points correspond to current. The drive circuit includes a first plurality of logic gates connected to the columns of said matrix and a second plurality of logic gates connected to the rows of said matrix, said first and second pluralities of logic gates applying multilevel drive signals of equal steps to the devices of said matrix for writing and erasing digital information with respect to individual selected devices. In accordance with one aspect of the invention, a first bias signal is applied by the drive circuit to the devices of said matrix preparatory to switching a selected device into said second stable state, said first bias signal being established at a point proximate to and above said minimum threshold point. In response to a first command said drive circuit increases the signal magnitude in equal steps to the column and row, respectively, of said selected device so as to apply a drive signal to said device which exceeds the maximum threshold point. For switching a selected device into said first stable state, said drive circuit applies a second bias signal to the devices of said matrix established at a point proximate to and below said maximum threshold point. In response to a second command said drive circuit decreases the signal magnitude in equal steps to the column and row, respectively, of said selected device so as to apply a drive signal to said device which falls below the minimum threshold point. It may be appreciated that the first and second commands may correspond to write and erase commands, but not necessarily in the order recited.

In accordance with another aspect of the invention, information stored within said matrix may be read out by applying a signal transient to the selected device.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

DESCRIPTION OF THE PREFERRED EMBODIMENTS

Figure 1:
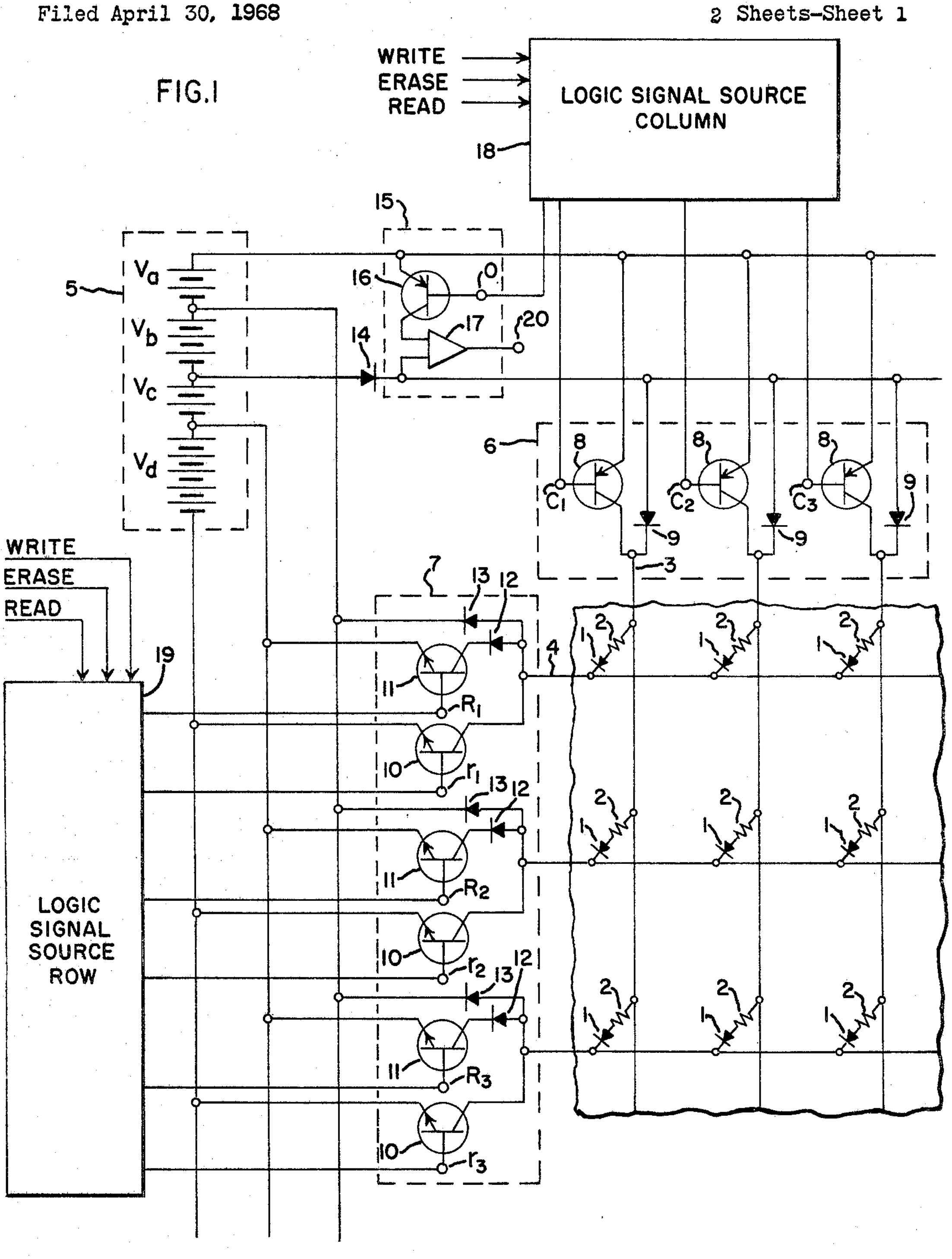
FIG. 1 is a schematic circuit diagram of drive circuitry for a matrix of bistable devices, in accordance with the invention.

With reference to FIG. 1, there is illustrated in accordance with the invention, drive circuitry for supplying write, erase and readout voltages to bistable devices 1 of a storage matrix. In the embodiment under consideration, the bistable devices are of the type exhibiting an S type negative resistance V–I curve. More specifically, the devices 1 are p-si-n storage diodes arranged in a columnrow configuration. For ease of illustration, there are shown only nine such diodes. However, in practice a great multiplicity of devices are normally employed, numbering from several hundred to the thousands.

It may be noted that the principles of invention herein presented with respect to the specific p-si-n diode matrix apply equally in an analogous fashion to devices exhibiting an N type negative resistance V–I curve.

Figure 2:
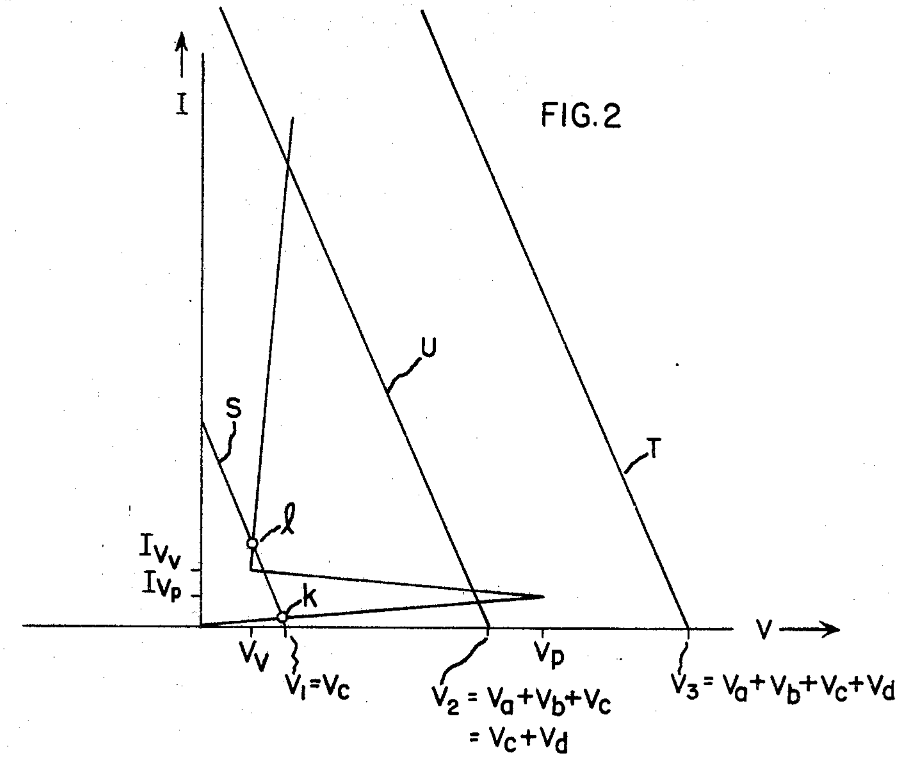
FIG. 2 is a V–I curve employed in describing a write operation for the circuit of FIG. 1.
Figure 3:
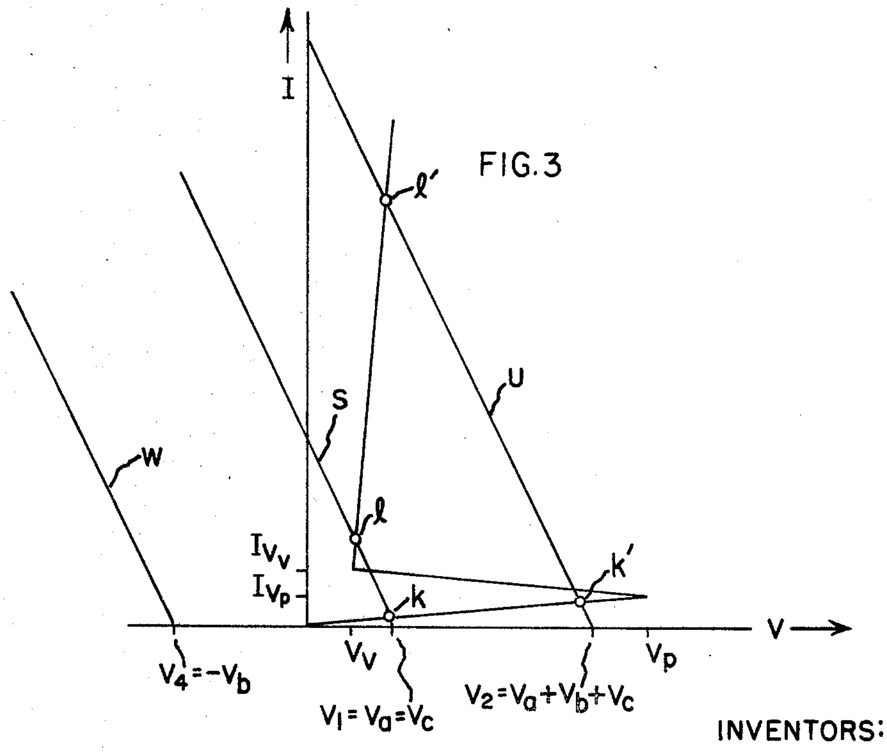
FIG. 3 is a V–I curve employed in describing erase and readout operations for the circuit of FIG. 1.

Referring again to FIG. 1, the diodes 1 are connected by series current limiting resistors 2 between column conductors 3 and row conductors 4. A V–I curve for the diodes 1 is shown in FIGS. 2 and 3, wherein it may be seen that a negative resistance region exists between a peak voltage $V_p$, which is the maximum threshold point, and a valley voltage $V_v$, which is the minimum threshold point. These voltages have corresponding peak and valley currents $I_{v_p}$ and $I_{v_v}$. A first stable state of high positive impedance, or low current, exists for currents less than $I_{v_p}$, and a second stable state of low positive impedance, or high current, exists for currents greater than $I_{v_v}$. A selected diode is switched from its low current state to its high current state by applying a drive voltage greater than $V_p$, and is switched from its high current state to its low current state by applying a drive voltage less than $V_v$. In the operation of these devices in the circuit of FIG. 1 either condition may be employed to represent stored information, and the opposite condition to represent the absence of stored information. In the operation to be considered, the high current state represents stored information and the low current state the absence of stored information.

The drive circuitry includes a multilevel voltage source 5, schematically illustrated by four serially connected batteries $V_a$, $V_b$, $V_c$ and $V_d$. The voltage source 5 is connected by a first logic gate network 6 to the column conductors 3 and by a second logic gate network 7 to the row conductors 4. Logic gate network 6 includes groups of shunt paths of a PNP transistor 8 and a signal diode 9 connected to each of the column conductors 3, components 8 and 9 poled to conduct current toward conductors 3. Network 7 includes groups of shunt paths of a NPN transistor 10, NPN transistor 11, diode 12, and diode 13 connected to each row conductor 4, components 10 to 13 poled to conduct current away from conductors 4. The positive terminal of battery $V_a$ is connected through transistors 8 to each of the column conductors 3. The junction of battery $V_a$ and $V_b$ is connected through diodes 13 to each of the row conductors 4. The junction of batteries $V_b$ and $V_c$ is connected by a common diode 14 through diodes 9 to the conductors 3, diode 14 poled in the same direction as diodes 9. The junction of batteries $V_c$ and $V_d$ is connected by the serially arranged transistors 11 and diodes 12 to each of the row conductors 4, and the negative terminal of battery $V_d$ is connected through transistors 10 to the row conductors 4.

A readout network 15 is provided which includes the serial connection of a transistor 16 and a readout amplifier 17 connected from the positive terminal of battery $V_a$ to the junction of diode 14 and diodes 9. Readout amplifier 17 is a conventional A.C. amplifier component of low input impedance which responds to change in current. It is noted that the dynamic impedance of the first and second stable states of operation must be substantially different for distinguishing the two states in the readout.

The battery voltages are applied in approximately equal voltage steps to the column and row conductors so that on-axis devices, i.e., those in the same column or row as the selected device, are equally non-responsive to switching voltages applied to said selected device. In the present configuration equal voltage steps are applied by providing the battery voltages with the following relationships:

$$V_a+V_b=V_c+V_b=V_d \qquad (1)$$

A first logic signal source 18 is connected to the control terminals of transistors 8, the terminals being identified as $C_1$, $C_2$ and $C_3$, corresponding to the order of the columns to which the transistor gates are connected. A second logic signal source 19 is connected to the control terminals of transistors 10 and 11, the terminals of transistors 10 being identified as $r_1$, $r_2$, $r_3$ and the terminals of transistors 11 being identified as $R_1$, $R_2$ and $R_3$, corresponding to the order of the rows to which the transistor gates 10 and 11 are connected. Source 18 also is connected to the control terminal O of transistor 16. Logic signal sources 18 and 19 are conventional pulse generating networks for providing control signals which operate the transistor gates 8, 10, 11 and 16 in the sequences described below.

The operation of the circuit of FIG. 1 includes a write sequence, an erase sequence and a readout sequence. In the write sequence, a pre-write bias voltage is applied to all of the diodes 1 as a first step, illustrated as voltage $V_1$ in FIG. 2. A load line S may be drawn from $V_1$ intersecting the positive impedance regions of the V–I curve at points $k$ and $l$. The pre-write bias condition is accomplished by applying logic signals to the control terminals of the transistor gates as follows:

$C_1, C_2, C_3 \rightarrow$ OFF
$R_1, R_2, R_3 \rightarrow$ ON
$r_1, r_2, r_3 \rightarrow$ OFF
O $\rightarrow$ OFF For actuating the transistor gates as above indicated D.C. signals of positive polarity are applied to PNP transistor gates 8 and 16, and D.C. signals of negative polarity are applied to NPN transistor gates 10 for preventing conduction in transistors 8, 10 and 16. Further D.C. signals of positive polarity are applied to NPN transistor gates 11 for providing a saturated conduction in said transistors. The polarities of the applied logic signals that are referred to herein are with respect to the associated emitter electrodes. Accordingly, the battery voltage $V_c$, equal to $V_1$ in FIG. 2, is applied across each of the diodes 1 by means of conduction paths through diodes 9 and transistors 11. Diodes 13 are placed in a back biased condition by conduction through transistors 11.

In order to write information into a single storage diode, connections are made to the column and row conductors 3 and 4 of the selected diode for momentarily placing thereacross a write voltage equal to $V_3$ in FIG. 2. It may be recognized that $V_3$ must exceed $V_p$ by an amount sufficient to bring the load line T extending from $V_3$ beyond the peak voltage $V_p$. Stated otherwise, $V_p$ must lie between $V_2$ and $V_3$. Since for the numerous diodes of the matrix $V_p$ is not a precisely defined point but exists within a range of values, to maximize the difference between $V_2$ and $V_3$ permits the greatest tolerance in the value of $V_p$.

Let it be assumed the selected diode is that one coupled to the intersection of the second column and second row, and that this diode has no information presently stored and is therefore biased at point $k$. In response to a write command, the following logic signals are applied to the transistor gates:

$C_2 \rightarrow$ ON
$r_2 \rightarrow$ ON

The write logic signals are in the form of pulses, typically of a duration in the tens of microseconds. A negative polarity pulse is applied to terminal $C_2$ for causing its transistor 8 to fully conduct, and a positive polarity pulse is applied to terminal $r_2$ for causing its transistor 10 to fully conduct. Battery voltages $V_a+V_b+V_c+V_d$, equal to $V_3$ in FIG. 2, are thus connected across the selected diode 1 by means of the transistor 8 connected to the second column and the transistor 10 connected to the second row. Conduction of transistor 8 back biases the shunt connected diode 9. Conduction of transistor 10 back biases the shunt connected diode 12 and prevents further conduction in the associated transistor 11.

During the application of the write logic signals, a half select voltage $V_2$, shown in FIG. 2, is coupled across each of the on-axis diodes 1 in the second column and row, other than the selected diode. A load line U may be drawn from $V_2$. Battery voltages $V_a+V_b+V_c$ are applied across the remaining diodes in the second column by the associated transistor 8 and transistor 11. Battery voltages $V_c+V_d$ are applied across the remaining diodes in the second row by the associated transistor 10 and diodes 9. It is necessary that the half select voltages be safely lower than the peak voltage $V_p$ so that the unselected diodes are not spuriously switched. During the time the write signals are applied to the column and row of the selected device, all other off-axis diodes are unaffected and continue to have applied the pre-write bias voltage. Upon termination of the write signals, the pre-write bias voltage is again established. The selected diode is switched to point *l*. All other on-axis diodes return to their previous pre-write bias point. It is noted that if the selected diode had originally stored information and was at point *l*, it would return to point *l* following the write operation.

The writing sequence thus far described may be continued for writing information into the other selected diodes.

In the erase sequence, a pre-erase bias voltage is applied to all of the diodes 1 as a first step, illustrated as voltage $V_2$ in FIG. 3. It will be noted that the pre-erase bias voltage in FIG. 3 is equal to the half select voltage level of the write operation in FIG. 2. Load line U intersects the positive regions of the V–I curve at points *k'* and *l*. The pre-erase bias voltage is provided by applying logic signals from signal source 18 and 19 to the control terminals of the transistor gates as follows:

$C_1$, $C_2$, $C_3$→ON
$R_1$, $R_2$, $R_3$→ON
$r_1$, $r_2$, $r_3$→OFF
O→OFF

Thus, D.C. signals of negative polarity are applied to transistor gates 8 and 10 and D.C. signals of positive polarity are applied to transistor gates 11 and 16. Thus, the battery voltages $V_a+V_b+V_c$ are applied across each of the diodes 1 through conduction paths including transistors 8 and 11.

Erasing information from a single diode 1 is accomplished by momentarily applying to the selected diode an erase voltage $V_4$, shown in FIG. 3. $V_4$ must be of a sufficiently low value so that the load line W extending from $V_4$ is below the valley voltage $V_v$. Stated otherwise, $V_v$ must lie between $V_1$ and $V_4$. Although subject to some variation in value, the values for $V_v$ are more stable than for $V_p$. Accordingly, although $V_4$ may not approach $-V_b$ for some operating conditions, due to voltage drops within the drive circuit, its value will readily accommodate variations in $V_v$.

Again considering the diode at the intersection of the second column and row, with information presently stored therein application of the pre-erase bias voltages establishes a bias at point 1' in FIG. 3. In response to an erase command, the following logic signals in the form of pulses, typically of tens of microseconds duration, are applied to the transistor gates:

$C_2$→OFF
$R_2$→OFF

Accordingly, a positive polarity pulse is applied to terminal $C_2$ and a negative polarity pulse is applied to $R_2$. A conduction path is thereby established from the junction of batteries $V_b$ and $V_c$ through diode gate 14, the diode gate 9 connected to the second column, the selected storage diode 1, the diode gate 13 connected to the second row to the junction of batteries $V_a$ and $V_b$ so as to place across the selected diode the battery voltage $-V_b$, assuming negligible voltage drop across the drive circuit components.

During the operation of the erase logic signals, a half select voltage $V_1$ in FIG. 3 is coupled across each of the diodes 1 in second column and row, other than the selected diode. Hence, battery voltage $V_c$ is applied across the remaining diodes in the second column by the associated diode 9 and transistor gates 11, and battery voltage $V_a$ is applied across the remaining diodes in the second row by the associated diode gate 13 and transistor gates 8. Again, half select voltages must be sufficiently more positive than the valley voltage $V_v$ so that the unselected diodes are not falsely switched. Off-axis diodes continue to have applied the pre-erase bias voltage established by $V_2$. Upon termination of the erase signals, the pre-erase bias voltage is again established. The selected diode is switched to point *k'*. All other on-axis diodes return to their previous pre-erase bias point. If the selected diode had not originally stored information and was at point *k'*, it would return to point *k'* following the erase operation.

Additional erase operations may be performed with respect to other selected diodes by selectively applying to said diodes voltage $V_4$ in the manner above described. In order to have a following write operation, it is necessary to first shift the bias to the pre-write bias voltage level.

Considering the readout sequence, the pre-erase bias voltage is first applied to all diodes. Again, the storage diode connected to the intersection of the second column and row will be considered. In response to a read command, logic signals are applied to the control terminals of the transistor gates as follows:

O→ON
$C_2$→OFF
$R_2$→OFF–ON–OFF–ON

Accordingly, at the initiation of this period, a negative polarity pulse is applied to terminal O, and a positive polarity pulse is applied to terminal $C_2$. A succession of positive and negative polarity pulses, typically of tens of microseconds duration, are applied to terminal $R_2$ for causing its transistor gate 11 to be intermittently fully conducting and non-conducting. Readout current is caused to flow from source 5 through transistor gate 16, readout amplifier 17, the diode gate 9 connected to the second column, the selected storage diode 1, and alternately through transistor gate 11 and diode gate 13 connected to the second row, and return to source 5. The applied voltage across the selected diode is caused to switch between $V_2$ and $V_1$. The resulting change in current through the readout amplifier 17 is a function of the impedance state of the diode being read so that indication of the diode's impedance state may be obtained from the output terminal 20 of the amplifier.

It may be appreciated that none of the remaining diodes in the second column or second row contribute to the read amplifier output. Thus, although currents through the remaining diodes in the second column flow through the readout amplifier 17, these currents flow steadily through the transistor gates 11. Since the readout amplifier 17 responds only to current change, they do not contribute to the output. Currents through the remaining diodes in the second row flow through the transistor gates 8 and thereby by-pass the readout amplifier 17. They therefore cannot contribute to the output.

For one exemplary embodiment of the circuit under consideration the following components and component values are presented:

Battery voltage $V_a$ and $V_c$—7 volts
Battery voltage $V_b$—11 volts
Battery voltage $V_d$—18 volts
P-SI-N diodes 1—$V_p \cong 30$ volts; $V_v \cong 4$ volts; and $I_{v_v} < 1$ ma.
PNP transistors 8 and 16—GE Type 2N396
NPN transistors 10 and 11—GE Type 2N2243
Diodes 9, 12, 13, 14—GE Type 1N3600
Resistors 2—1000 Ω±10%

A number of alternative operations may be employed with respect to the drive circuit of FIG. 1, generally incorporating the principles herein set forth. For example, as described the pre-write and pre-erase bias voltages are D.C. signals establishing two steady state conditions. Operation in this manner is desirable where write and erase sequences are performed with approximately equal frequency. However, the circuit may be operated with a single steady state condition, either at the pre-write or pre-erase bias voltage level. If a single steady state bias is established at the pre-write bias level, erase sequence may be performed in two steps employing logic signals in the form of pulses for both steps. Thus, starting from a steady state condition at pre-write bias voltage $V_1$, in the first step of the sequence the off-axis diodes and half of the on-axis diodes are shifted to voltage level $V_2$, and in the second step of the sequence the selected diode is shifted to voltage $V_4$, the other half of the on-axis diodes remaining at $V_1$. The pulses applied must extend over the entire sequence. At the termination of the erase sequence the steady state bias voltage is re-established at $V_1$. In a similar operation, a single steady state condition may be established at the pre-erase bias voltage $V_2$.

In addition, it is noted that as a function of the operation of the logic signal sources, the logic signals supplied may be each of a single polarity for turning ON the respective transistors, wherein absence of said signals provides turn OFF.

The described embodiment employs bistable devices exhibiting a negative resistance characteristic of S type. It must be appreciated that the drive circuit and principles of operation herein presented apply equally to a matrix of bistable devices exhibiting an N type negative resistance characteristic wherein the maximum and minimum threshold points correspond to peak and valley currents, respectively. Devices such as tunnel diodes fall within this category. For this operation, the driver source supplies drive currents to the devices for switching between stable operating states.

Other modifications may occur to those skilled in the art, which insofar as they fall within the true scope of the invention are intended to be included by the appended claims.

What we claim as new and desire to secure by Letters Patent of the United States is:

1. A drive circuit for driving a storage matrix of bistable devices exhibiting a negative resistance characteristic having maximum and minimum threshold points defining, respectively, first and second stable states of operation, comprising:

(a) a multilevel energy source,
(b) gate means for selectively coupling said multilevel energy source to said matrix, including
(c) first means for applying a first bias signal to said devices established at a first bias point between said maximum and minimum threshold points proximate to said minimum point,
(d) second means for applying a first drive signal to a first selected device which is greater than said maximum threshold point so as to place said selected device in said second stable state,
(e) third means for applying a second bias signal to said devices established at a second bias point between said maximum and minimum threshold points proximate to said maximum point, and
(f) fourth means for applying a second drive signal to a second selected device which is less than said minimum threshold point so as to place said second selected device in said first stable state, whereby information may be entered and erased within said matrix by switching selected devices between their first and second stable states of operation.

2. A drive circuit as in claim 1 wherein said bistable devices are connected across pairs of intersecting conductors and said second means applies said first drive signal by increasing the signal magnitude in first equal steps to intersecting conductors of said first selected device, each step being approximately equal to the difference in magnitude between said first and second bias points.

3. A drive circuit as in claim 2 wherein said fourth means applies said second drive signal by decreasing the signal magnitude in second equal steps to intersecting conductors of said second selected device, each second step being approximately equal to the difference in magnitude between said first and second bias points.

4. A drive circuit as in claim 3 in which said multilevel energy source comprises a tapped voltage source.

5. A drive circuit as in claim 4 in which said gate means comprises logic controlled semiconductor gates providing shunt paths from tapped levels of said voltage source to each of the conductors of said matrix.

6. A drive circuit as in claim 5 in which said devices exhibit an S type negative resistance characteristic and said maximum and minimum threshold points correspond to voltages.

7. A drive circuit as in claim 6 wherein said first and second stable states have appreciably different dynamic impedances, which includes fifth means for applying an alternating drive signal to a third selected device which alternates between said first and second bias points, and current sensing means responsive to said alternating drive signal for sensing the state of said third selected device.

8. A drive circuit for driving a storage matrix of bistable devices exhibiting a negative resistance characteristc having maximum and minimum threshold points defining, respectively, first and second stable states of operation having appreciably different dynamic impedances, comprising:

(a) a multilevel energy source,
(b) gate means for selectively coupling said multilevel energy source to said matrix, including
(c) means for applying an alternating drive signal to a selected device which alternates between two points within said maximum and minimum threshold points,
(d) current sensing means responsive to said alternating drive signal for sensing the state of said third selected device, and
(e) means for biasing the remaining devices of said matrix within said maximum and minimum threshold points.

9. A drive circuit as in claim 8 in which said multilevel energy source comprises a taped voltage source.

10. A drive circuit as in claim 9 wherein said bistable devices are connected across pairs of intersecting conductors and in which said gate means comprises logic controlled semiconductor gates providing shunt paths from tapped levels of said voltage source to each of the conductors of said matrix.

References Cited

UNITED STATES PATENTS 3,017,613 1/1962 Miller -------------- 340—173

TERRELL W. FEARS, Primary Examiner

U.S. Cl. X.R.

307—88; 340—166